United States Patent [19]

Shirahata et al.

[11] Patent Number: 4,673,610

[45] Date of Patent: Jun. 16, 1987

[54] MAGNETIC RECORDING MEDIUM HAVING IRON NITRIDE RECORDING LAYER

[75] Inventors: Ryuji Shirahata; Yoshihiro Arai; Tadashi Yasunaga, all of Kanagawa, Japan

[73] Assignee: Fuji Photo Film Company, Limited, Japan

[21] Appl. No.: 767,778

[22] Filed: Aug. 20, 1985

[30] Foreign Application Priority Data

Aug. 24, 1984 [JP] Japan ................. 59-176163

[51] Int. Cl.$^4$ .................................. G11B 5/66
[52] U.S. Cl. ........................... 428/213; 428/332; 428/694; 428/698; 428/699; 428/900
[58] Field of Search ............ 428/694, 900, 698, 699, 428/213, 332

[56] References Cited

U.S. PATENT DOCUMENTS 3,681,018  8/1972  Knauff .................... 423/274
4,271,232  6/1981  Heiman et al. .............. 428/694

FOREIGN PATENT DOCUMENTS 59304  4/1982  Japan .
 159240  9/1983  Japan .
  87809  5/1984  Japan .
 144043  8/1984  Japan .
 144037  8/1984  Japan .
 144034  8/1984  Japan .
 59-537  4/1985  Japan .

Primary Examiner—George F. Lesmes
Assistant Examiner—William M. Atkinson
Attorney, Agent, or Firm—Gerald J. Ferguson, Jr.; Michael P. Hoffman; Ronni S. Malamud

[57] ABSTRACT

A magnetic recording medium comprises a non-magnetic substrate, a first magnetic film layer which is formed on the non-magnetic substrate and whose major component is cobalt, and a second magnetic film layer which is overlaid on the first magnetic film layer and whose major component is iron nitride.

7 Claims, 2 Drawing Figures

MAGNETIC RECORDING MEDIUM HAVING IRON NITRIDE RECORDING LAYER

BACKGROUND OF THE INVENTION

1. Field of the Invention

This invention relates to a magnetic recording medium, and more particularly to a non-binder type magnetic recording medium useful as a video recording tape and the like.

2. Description of the Prior Art

As magnetic recording media, there have been in wide use so-called coating-type magnetic recording media which are formed by applying dispersion of powdered magnetic material in an organic binder to a non-magnetic substrate and drying it. The coating type magnetic recording media are not suitable for high density recording since the metal oxides used as the magnetic material have a saturation magnetization which is smaller than that of the ferromagnetic metals. Further, the coating-type magnetic recording medium is disadvantageous in that the manufacturing process is complicated and large scale equipment is required for recovery of solvents and prevention of environmental pollution.

In order to meet strong demand for high density recording, there have been developed so-called non-binder-type magnetic recording media having, as the magnetic recording layer, a ferromagnetic film formed by a vapor deposition process such as vacuum deposition, sputtering, ion plating or the like, or a plating process such as electroplating or electroless plating. The non-binder-type magnetic recording medium is advantageous over the coating-type magnetic recording medium in that the recording layer can be formed of ferromagnetic metal having a saturation magnetization larger than that of the metal oxide used for forming the recording layer of the coating-type recording medium and can be formed without non-magnetic material such as the binder included in the recording layer, and accordingly the recording layer of the non-binder-type magnetic recording medium has a higher magnetic coercive force and is smaller in thickness than the recording layer of the coating-type recording medium. Further, the non-binder-type magnetic recording medium can be manufactured by relatively simple manufacturing process and is free from environmental pollution due to organic solvents. In particular, the recording layer of the non-binder-type recording medium can be thinner than that of the coating-type recording medium by one order of ten and it has therefore been considered to be the better recording medium for high density magnetic recording.

However, the magnetic film (recording layer) of the non-binder-type magnetic recording medium is apt to corrode and is inferior to the recording layer of the coating-type magnetic recording medium in resistance to weathering and rust prevention properties. A particular is that when the recording layer is rubbed with a magnetic head during recording/reproduction, even slight rust on the surface of the recording layer can cause clogging of the magnetic head, which can result in damage to both the recording medium and the magnetic head. When rusting in the recording layer proceeds further, the recording layer is apt to peel off to cause loss of recorded information.

Further, there is a problem with the durability of the non-binder-type magnetic recording medium since it is inferior to the coating-type magnetic recording medium in still durability as used in a video tape recorder, and therefore there is a great demand for improvement thereof.

There have been proposed various methods of improving the resistance to weathering and durability of the non-binder-type magnetic recording medium. For example, it is proposed in Japanese Unexamined Patent Publication No. 50(1975)-33806 to surface-nitride the non-binder-type magnetic recording medium by ion plating process. In Japanese Unexamined Patent Publication No. 53(1978)-30304, there is disclosed a method in which a silicon nitride film is formed on the surface of the non-binder-type magnetic recording medium by sputtering. In Japanese Unexamined Patent Publication No. 53(1978)-85403 is disclosed a method in which a magnetic film is exposed to discharge in a nitrogen atmosphere to form a non-magnetic surface layer. Further, in Japanese Unexamined Patent Publication No. 54(1979)-143111, there is disclosed a method in which a metal nitride film is formed on a magnetic metal film. However, these methods are all unsatisfactory in that the protective layer formed must be large in thickness in order to obtain sufficient resistance to weathering and sufficient durability. When the protective layer is large in thickness, the electromagnetic conversion properties are significantly deteriorated and the advantage of the non-binder-type magnetic recording medium is lost. A non-binder-type magnetic recording medium having a magnetic film of iron nitride and iron, or of iron nitride disclosed in European Pat. No. 8328 or Japanese Unexamined Patent Publication No. 59(1984)-87809 exhibits superior resistance to weathering, but is insufficient in magnetic properties and durability.

SUMMARY OF THE INVENTION

In view of the foregoing observations and description, the primary object of the present invention is to provide a magnetic recording medium which exhibits excellent resistance to weathering, durability and electromagnetic conversion properties.

The magnetic recording medium in accordance with the present invention comprises a non-magnetic substrate, a first magnetic film layer which is formed on the non-magnetic substrate and whose major component is cobalt, and a second magnetic film layer which is overlaid on the first magnetic film layer and whose major component is iron nitride.

As the magnetic metal material for forming the first magnetic film layer, ferromagnetic alloys such as Fe—Co, Co—Ni, Fe—Co—Ni, Co—Sn, Co—Cu, Co—Au, Co—Y, Co—La, Co—Pr, Co—Gd, Co—Sm, Co—Pt, Co—P, Co—V, Co—Mn, Co—W, Co—Nb, Co—Mo, Co—Cr, Co—Ta, Fe—Co—Cr, Ni—Co—Cr, Fe—Co—Ni—Cr and the like may be used in addition to Co. Alloys containing Co by not less than 70 weight % are especially preferred.

Further, it is preferred that the second magnetic film layer contain 5 to 40 atomic % nitrogen atoms. The second magnetic film layer may contain cobalt, nickel, oxygen and the like in addition to iron nitride.

Preferably the first magnetic film layer is formed by the oblique incidence deposition process and preferably the second magnetic film layer is formed by the oblique incidence ion plating process.

In the oblique incidence deposition and the oblique incidence ion plating, a vapor flow of metal material for forming the film layer is caused to impinge upon the substrate surface at an angle $\theta$ with respect to the direction normal to the substrate surface.

In this specification, the term "deposition" should be broadly interpreted to include, in addition to general vacuum deposition methods such as those disclosed in U.S. Pat. No. 3,342,632, for instance, methods in which a film layer is formed on a substrate by effecting ionization, acceleration and the like of the vapor flow by an electric field, a magnetic field, irradiation of an electron beam, and the like to make an atmosphere in which the mean free path of the vapor molecules is long. For example, the electric field deposition process disclosed in Japanese Unexamined Patent Publication No. 51(1976)-149008 and the ionization deposition processes disclosed in Japanese Patent Publications Nos. 43(1968)-11525, 46(1971)-20484 and 49(1974)-45439 and Japanese Unexamined Patent Publication No. 49(1974)-34483 may be employed in the present invention.

In the oblique incidence deposition process, deposition is started at a high incidence angle $\theta_{max}$ and the incidence angle $\theta$ is continuously reduced as the substrate is transferred and the deposition is terminated at a low incidence angle $\theta_{min}$. The deposition may be effected in an atmosphere containing a reactive gas such as oxygen.

In this specification, the term "ion plating" denotes various methods in which part of a non-magnetic metal material evaporated from a vapor source is positively ionized in a vacuum or inert gas atmosphere and accelerated toward a negatively charged substrate to be deposited thereon as a film. For example, there are included the DC ion plating method invented by D. M. Mattox and disclosed in Japanese Patent Publication No. 44(1969)-8328 in which glow discharge is generated in an inert gas atmosphere at 0.01 to 0.1 Torr by applying a positive voltage to a vapor source and a negative voltage to a substrate, and metal is evaporated from the vapor source in the glow discharge to be deposited on the substrate to form a film; the high-frequency excitation type ion plating method disclosed in Japanese Unexamined Patent Publication No. 49(1974)-113733 in which high frequency power is applied to a coil electrode disposed between a positively charged vapor source and a negatively charged substrate in a gas atmosphere at $10^{-4}$ to $10^{-3}$ Torr and vapor particles are ionized by the high frequency electric field established by the high frequency power applied to the coil electrode; the cluster ion type ion plating method disclosed in Japanese Unexamined Patent Publication No. 49(1974)-33890 in which a positively charged vapor source and a negatively charged ion drawing electrode are disposed in a vacuum chamber, vapor ejected through an orifice of the vapor source is irradiated with an electron beam to form cluster ions, and vapor particles are accelerated by the negative voltage at the ion drawing electrode toward a negatively charged substrate; and the ion plating methods disclosed in Japanese Patent Publication No. 43(1968)-11525, Japanese Unexamined Patent Publication No. 49(1974)-34483, Japanese Patent Publication No. 49(1974)-47910 and the like in which vapor flow is ionized by being passed through an electron beam and then caused to impinge upon a substrate. When a magnetic film layer of iron nitride and iron or of iron nitride alone is formed by ion plating, iron is evaporated from a vapor source and at the same time, nitrogen gas or other gas containing nitrogen such as ammonia gas is introduced as a reactive gas. The incidence angle should be not smaller than 25° and is preferably not smaller than 30°.

The total thickness of the magnetic film layer of the magnetic recording medium in accordance with the present invention is generally 0.02 $\mu$m to 2.0 $\mu$m, and is preferably 0.05$\mu$m to 1.0$\mu$m taking into account the thickness required to give sufficient output as a magnetic recording medium and the thickness suitable for high density recording. The ratio of the thickness of the first magnetic film layer to that of the second magnetic film layer should be 1:8 to 8:1, and is preferably 1:5 to 5:1.

The non-magnetic substrate may be of plastic base material such as polyethylene terephthalate, polyimide, polyvinyl chloride, cellulose triacetate, polycarbonate, polyethylene naphthalate, polyamide, polyphenylene sulfide or the like, or may be of metal or alloy such as aluminum, brass or stainless steel.

There may be formed on the magnetic film layer a lubricant layer such as of fatty acids the carbon number of which is 12 to 18 (R1COOH, R1 being an alkyl or alkylene group having 11 to 17 carbon atoms), metallic salts of such fatty acids, silicone oils, at least one of fatty esters consisting of monobasic fatty acids the carbon number of which is 2 to 20 and monovalent alcohols the carbon number of which is 3 to 12, or the like. The lubricant is preferably provided on the magnetic film in an amount of 0.5 to 20 mg/m$^2$. The lubricant may be directly coated on the magnetic film or may be transferred to the magnetic film after once coated on a support.

If desired, a so-called back layer may be provided on the back side of the substrate. Further, if desired, an organic or inorganic layer may be formed between the substrate and the magnetic film.

DETAILED DESCRIPTION OF THE INVENTION

Now, the present invention will be described in more detail with reference to examples.

Figure 1:
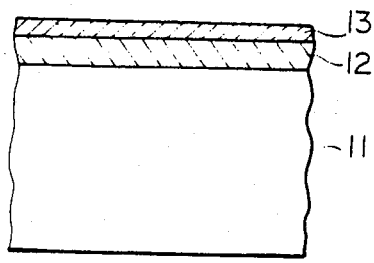
FIG. 1 is a fragmentary cross sectional view showing a magnetic recording medium in accordance with an embodiment of the present invention.

FIG. 1 shows a typical magnetic recording medium in accordance with the present invention. As shown in FIG. 1, the magnetic recording medium comprises a non-magnetic substrate 11, a first magnetic film layer 12 which is formed on the non-magnetic substrate 11 and whose major component is cobalt, and a second magnetic film layer 13 which is overlaid on the first magnetic film layer 12 and whose major component is iron nitride. Each of the first and second magnetic film layers 12 and 13 may be of a plurality of layers.

EXAMPLE 1

Figure 2:
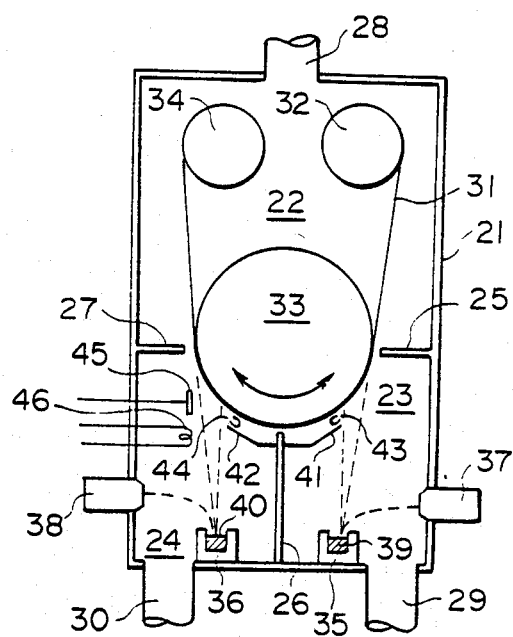
FIG. 2 is a schematic view showing a part of an apparatus used for preparing a magnetic recording tape in accordance with an embodiment of the present invention.

By using the deposition apparatus shown in FIG. 2, a magnetic film layer was formed on a 12.5$\mu$m thick polyimide substrate, thereby preparing magnetic recording tapes.

In FIG. 2, the internal space of a vacuum tank 21 is divided into three chambers, a feed/take-up chamber 22, an oblique incidence deposition chamber 23 and an oblique incidence ion plating chamber 24, by partition walls 25, 26 and 27. The three chambers 22 to 24 are independently evacuated through discharge orifices 28, 29 and 30. Non-magnetic substrate 31 is fed from a roll 32 and transferred along a cooling can 33 via the deposition chamber 23 and the ion plating chamber 24 and then wound around a take-up roll 34. The non-magnetic substrate 31 can be transferred back and forth between the rolls 34 and 32. Crucibles 35 and 36 are disposed below the cooling can 33 respectively in the deposition chamber 23 and the ion plating chamber 24. Vapor materials 39 and 40 respectively charged in the crucibles 35 and 36 are heated and evaporated by electron beams emitted from electron guns 37 and 38. Masks 41 and 42 are provided so that vapor flows of the materials 39 and 40 obliquely impinge upon the substrate 31 on the cooling can 33. Gas inlets 43 and 44 are provided respectively near the outer ends of the masks 41 and 42. An ionizing electrode 45 and a thermoionic emission filament 46 are disposed in the ion plating chamber 24.

In this example, Co was charged in the crucible 35 as the material 39 and Fe was charged in the crucible 36 as the material 40. The masks 41 and 42 were set so that the minimum incidence angles were respectively adjusted to 40° and 60°. Nitrogen gas was introduced into the ion plating chamber 24 through the gas inlet 44 to control the pressure in the ion plating chamber 24 to $8 \times 10^{-4}$ Torr. The thermoionic emitting filament 46 was heated to emit thermoelectrons and at the same time, an electric voltage of 60v was applied to the ionization electrode 45, thereby forming iron nitride. The pressure in the deposition chamber 23 was controlled to $6 \times 10^{-5}$. A polyimide film was unwound from the roll 32 and transferred through the deposition chamber 23 and the ion plating chamber 24 to be taken up around the roll 34 while an oblique incidence film layer of Co was formed on the polyimide film in the deposition chamber 23 and an iron nitride film layer was formed thereon in the ion plating chamber 24. The total thickness of the Co film layer and the iron nitride film layer was 0.18μm. Samples No. 1 to No. 3 were thus formed, the ratio of the thickness of the iron nitride film layer to that of the Co film layer of the samples No. 1 to No. 3 being 1:1, 1:2 and 2:1, respectively, and the total thickness of the film layers all being 0.18 μm. Further, samples No. 4 and No. 5 respectively having only an iron nitride film layer and only a Co film layer were prepared for the purpose of comparison.

Resistance to weathering, durability, and modulation noise of the samples No. 1 to No. 5 thus obtained were measured. The resistance to weathering was evaluated in terms of rusting condition after the samples were placed in a dew-cycle test type weatherometer (Yamazaki Seiki Kenkyusho, Model E-12WG) for 24 hours. The rusting condition was evaluated in five grades. The durability was evaluated in terms of damage to the magnetic film surface due to the magnetic head after the tapes were operated in still mode in a VHS type video tape recorder for fifteen minutes in the condition of 25° C. and 10% relative humidity. The damage to the magnetic film surface was evaluated in five grades as observed through a microscope. The modulation noise was measured by use of a device obtained by reducing to half the tape feeding speed of a beta type VTR.

The results are shown in Table 1.

TABLE 1

| | Co | iron nitride | resistance to weathering* | durability | noise (dB) |
|---|---|---|---|---|---|
| No. 1 | 0.12 μm | 0.06 μm | 5 | 4 | 1 |
| No. 2 | 0.09 μm | 0.09 μm | 5 | 5 | 1 |
| No. 3 | 0.06 μm | 0.12 μm | 5 | 4 | 2 |
| No. 4 | — | 0.18 μm | 5 | 2 | 6 |
| No. 5 | 0.18 μm | — | 1 | 2 | 2 |

*First to fifth grades, fifth (5) being the best.

EXAMPLE 2

In the deposition apparatus shown in FIG. 2, CoNi (Ni 20% by weight) was charged in the crucible 35 as the material 39 and Fe was charged in the crucible 36 as the material 40. The masks 41 and 42 were set so that the minimum incidence angles were respectively adjusted to 35° and 55°. Nitrogen gas was introduced into the ion plating chamber 24 through the gas inlet 44 to control the pressure in the ion plating chamber 24 to $5 \times 10^{-4}$ Torr. Oxygen gas was introduced into the deposition chamber 23 through the gas inlet 43 to control the pressure in the deposition chamber 23 to $2 \times 10^{-4}$ Torr. A 9.5 μm thick polyethylene terephthalate film was unwound from the roll 32 and was taken up around the roll 34 while an oblique incidence deposition film layer was formed thereon in the deposition chamber 23. Thereafter, the polyethylene terephthalate film was unwound from the roll 34 and was taken up around the roll 32 while an iron nitride film layer was formed thereon in the ion plating chamber 24. The total thickness of the oblique incidence deposition film layer and the iron nitride film layer was 0.12 μm. Samples No. 6 to No. 8 were thus formed, the ratio of the thickness of the iron nitride film layer to that of the deposition film layer of the samples No. 6 to No. 8 being 1:3, 1:1 and 3:1, respectively. Further, samples No. 9 and No. 10 respectively having only an iron nitride film layer and only a deposition film layer were prepared for the purpose of comparison.

Resistance to weathering, durability, and modulation noise of the samples No. 6 to No. 10 thus obtained were measured in the same manner as in Example 1.

The results are shown in Table 2.

TABLE 2

| | deposition* | iron nitride | resistance to weathering | durability | noise (dB) |
|---|---|---|---|---|---|
| No. 6 | 0.09 μm | 0.03 μm | 5 | 4 | 1 |
| No. 7 | 0.06 μm | 0.06 μm | 5 | 4 | 1 |
| No. 8 | 0.03 μm | 0.09 μm | 5 | 4 | 1 |
| No. 9 | — | 0.12 μm | 5 | 1 | 6 |
| No. 10 | 0.12 μm | — | 1 | 2 | 2 |

*deposition film layer

As can be understood from the above tables, the recording media (samples No. 1 to No. 3 and No. 6 to No. 8) in accordance with the present invention are superior to the other samples (samples No. 4, No. 5, No. 9 and No. 10) in resistance to weathering, durability and modulation noise properties.

We claim:

1. A magnetic recording medium comprising a non-magnetic substrate, a first magnetic film layer which is formed on the non-magnetic substrate and whose major component is cobalt, and a second magnetic film layer which is overlayed on the first magnetic film layer and whose major component is iron nitride, said first and second magnetic layers being non-binder type magnetic recording films.

2. A magnetic recording medium as defined in claim 1 in which said first magnetic film layer contains cobalt by not less than 70 weight %.

3. A magnetic recording medium as defined in claim 1 in which said first magnetic layer is formed by oblique incidence deposition.

4. A magnetic recording medium as defined in claim 1 in which said second magnetic film layer contains 5 to 40 atomic % nitrogen atoms.

5. A magnetic recording medium as defined in claim 1 in which said second magnetic film layer is formed by oblique incidence ion plating.

6. A magnetic recording medium as defined in claim 1 in which the total thickness of said first and second magnetic film layers is 0.02 $\mu$m to 2.0 $\mu$m.

7. A magnetic recording medium as defined in claim 1 in which the ratio of the thickness of said first magnetic film layer to that of the second magnetic film layer is 1:8 to 8:1.

* * * * *